United States Patent [19]

Dempsey et al.

[11] 4,031,437
[45] June 21, 1977

[54] WORK AND FEED CONTROL SYSTEM FOR CUTTING MACHINES

[75] Inventors: Edward Justin Dempsey, Huntington Beach; David Earl Kent, La Mirada, both of Calif.

[73] Assignee: Concrete Cutting Equipment Inc., Hawthorne, Calif.

[22] Filed: July 10, 1975

[21] Appl. No.: 594,584

[52] U.S. Cl. .................................. 318/39; 318/433
[51] Int. Cl.² ..................................... G05B 19/24
[58] Field of Search ............. 318/39, 571, 432, 433

[56] References Cited

UNITED STATES PATENTS

| | | | |
|---|---|---|---|
| 3,633,081 | 1/1972 | Weber et al. | 318/39 |
| 3,789,279 | 1/1974 | Dempsey et al. | 318/39 |
| 3,896,360 | 7/1975 | Meyer et al. | 318/571 |

Primary Examiner—Robert K. Schaefer
Assistant Examiner—John J. Feldhaus
Attorney, Agent, or Firm—Lindenberg, Freilich

[57] ABSTRACT

A control system for a cutting machine is disclosed in which the relative motion between a cutting tool, supported by a cutting motor, and the material to be cut is controlled by a feed motor. The cutting motor load level is continuously monitored and used to derive a load level signal which is related to the cutting motor load level and a desired cutting load level. The feed motor's forward speed is controlled to increase at a selected fixed rate until the cutting motor load level is substantially equal to the desired cutting load level. Whenever the cutting motor load level increases above the desired cutting load level, representing an overload condition, the speed of the feed motor in the forward direction is reduced at the rate of increase of the overload condition. If the cutting motor load level exceeds a threshold load level, the feed motor is driven in a reverse direction at a speed which increases or decreases at a rate related to the rate at which the cutting motor load level increases above or decreases toward said threshold load level.

16 Claims, 6 Drawing Figures

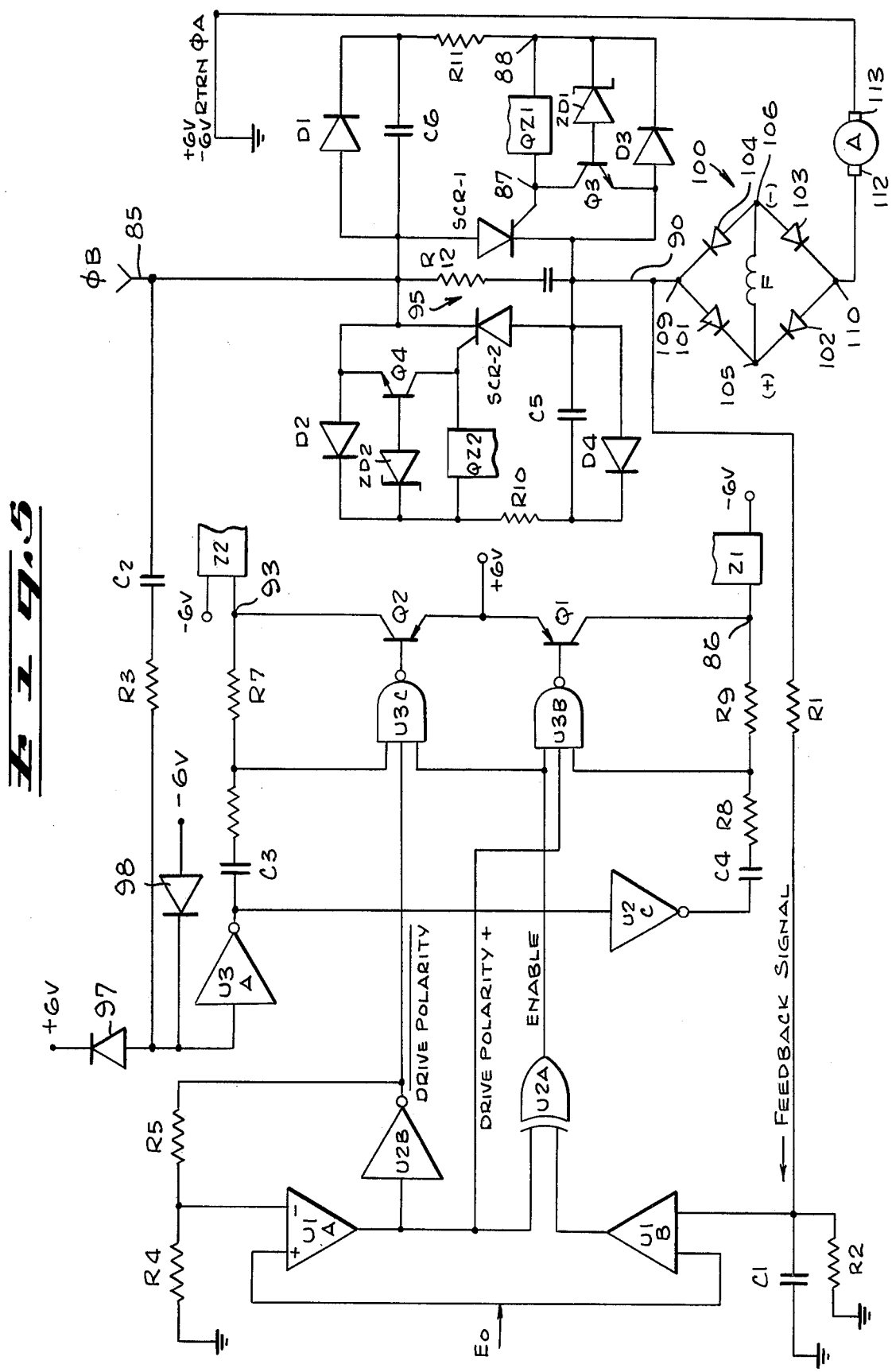

WORK AND FEED CONTROL SYSTEM FOR CUTTING MACHINES

BACKGROUND OF THE INVENTION

1. Field of the Invention

The invention relates to a control system for cutting machines and, more particularly, to servo control systems for work and feed cutting machines.

2. Description of the Prior Art

In U.S. Pat. No. 3,789,279, issued Jan. 29, 1974, assigned to the assignee of the present invention a work and feed control system for cutting machines is described in connection with a concrete cutting system. Briefly, therein a cutting motor drives a blade through a sheet of concrete. The cutting motor is mounted on a carriage which rolls or slides on a rail. A feed motor moves the carriage along the rail, so as to drive the blade into the concrete. A control system is provided to control the load on the cutting motor for optimum cutting and automatically corrects the cutting rate as conditions change. Control knobs permit an operator to set the desired load level. When the cutting motor load level exceeds a predetermined threshold load level the direction of rotation of the feed motor is reversed at full speed, and thereafter is switched back to the forward direction at a relatively limited speed for a predetermined period, in order to avoid slamming the blade into the concrete.

Although the above-described system has been found to operate relatively satisfactorily it has been discovered that significant improvements may be made in the control system, so as to increase reliability and speed of operation. The present invention is directed to the novel improvements in such a system.

SUMMARY OF THE INVENTION

In the control system of the present invention whenever the cutting motor load level is less than an operator-chosen variable desired level the feed motor is driven in the forward direction at a speed, which increases at a selected rate until the cutting motor load level equals the desired load level. If during the cutting operation the cutting motor load level exceeds the desired level, representing an overload level or condition, the feed motor speed in the forward direction is reduced at the rate of increase of the overload level above the desired load level, until the overload level equals a threshold overload level, at which time the feed motor is stopped. If the overload level exceeds the threshold overload level the direction of rotation of the feed motor is reversed. Its speed is increased at the rate at which the overload level increases above the threshold overload level.

When the overload level decreases from a level above the threshold overload level toward the latter the rate of speed of the feed motor in the reverse direction is decreased at the rate of decrease of the overload level, until the overload level equals the threshold overload level when the feed motor stops. Then, when the overload level further decreases so that it is less than the threshold overload level but greater than the desired load level the feed motor is again driven in the forward direction. The speed of the feed motor increases at a rate which is either at the selected rate, hereinbefore referred to, or at the rate at which the overload level decreases toward the desired load level, whichever rate is smaller. Included in the system is a novel feed motor controller which responds to DC analog input signals to control the direction of rotation and speed of the feed motor as a function of the polarities and amplitudes, respectively of the input signals.

The novel features of the invention are set forth with particularity in the appended claims. The invention will best be understood from the following description when read in conjunction with the accompanying drawings.

BRIEF DESCRIPTION OF THE DRAWINGS

FIGS. 4 and 5 are diagrams of the forward rate limiter and a feed motor controller respectively, shown in FIG. 2.

DESCRIPTION OF THE PREFERRED EMBODIMENTS

Figure 1:
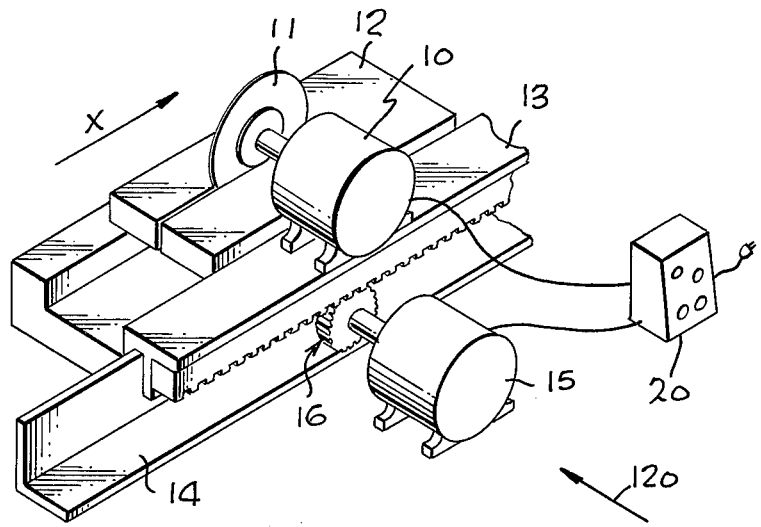
FIG. 1 is an isometric view of a concrete cutting system in accordance with the present invention.

Referring to FIG. 1, a concrete cutting system is shown by way of example. A cutting motor 10 drives a blade 11 to saw through a slab 12 of concrete. The cutting motor 10 is mounted on a carriage 13 which rides on a rail 14. A feed motor 15 moves the carriage along the rail through a rack and pinion assembly 16, as shown. A control unit 20 provides power to the two motors as will be described hereinafter in detail. Cutting motor 10 is preferably an induction motor which is supplies with 3-phase ac power, while the feed motor 15 is preferably a series wound motor.

For the arrangement diagrammed in FIG. 1 in which a cut in the concrete from left to right is assumed, as viewed in the direction of arrow X, the clockwise (CW) direction of rotation of the feed motor represents the forward direction, since when rotating CW the carriage 13 is moved from left to right to produce the left to right cut in the concrete slab 12. On the other hand when the feed motor 13 rotates counterclockwise (CCW) it represents a reverse direction of rotation.

Figure 2:
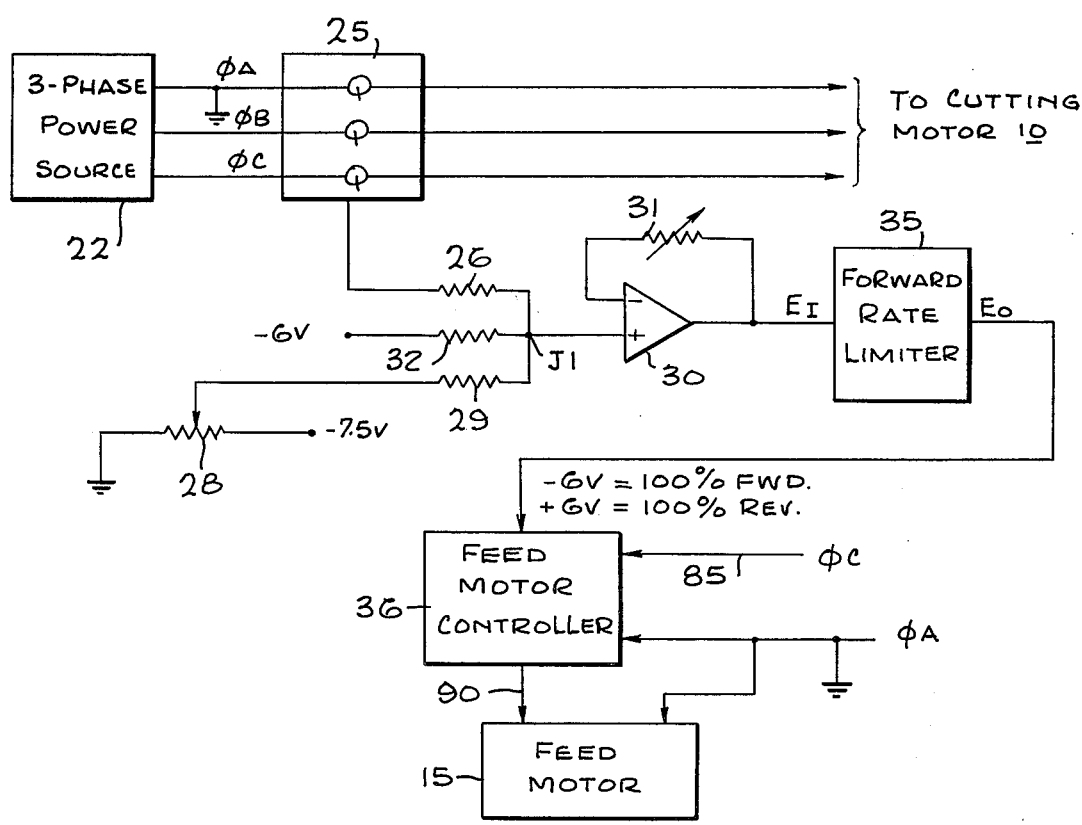
FIG. 2 is a block diagram of one embodiment of the present invention.

FIG. 1 is the same as FIG. 1 of the above-mentioned patent. The novelty of the present invention is in the control unit 20, which is shown in block form in FIG. 2. Therein, numeral 22 designates a 3-phase power source which is connected to the cutting motor 10 through a load detector 25. The three phases are designated by $\phi A$, $\phi B$ and $\phi C$, and $\phi A$ is assumed to be ground. The function of the load detector 25 is to provide a DC voltage, assumed to be positive, which is proportional to the average current of the three phases of current to the cutting motor 10. As the load level on the cutting motor 10 increases, the amplitude of the positive dc voltage increases, while decreasing with decreasing load level. In FIG. 2 the positive dc voltage is assumed to be supplied to a junction point J1 through a resistor 26. Also supplied to junction point J1 is a negative DC voltage, set by potentiometer 28 through a resistor 29. Thus, J1 acts as a voltage summing junction. The voltage at J1 is amplified by an amplifier 30 whose loop gain is controlled by variable resistor 31.

It should be apparent that the output voltage of amplifier 30 is related to the cutting motor load level and the setting of potentiometer 28. However, regardless of the actual setting of the latter whenever the cutting motor load level increases the output voltage of amplifier 30 increases, i.e., becomes more positive or less negative, and when the cutting motor load level decreases the output voltage decreases, i.e., becomes less positive or more negative.

The operator, by means of a knob on the front panel of control unit 20 sets potentiometer 28 so that during operation the feed motor 15 moves the carriage 13 and thereby drives the blade 11 into the concrete at a speed for optimum or desired load level or condition on the cutting motor. This point will better be appreciated from the following description. At this point however it is sufficient to point out that potentiometer 28 is set so that under desired load level operation the output of amplifier 30 is negative. If desired, a small negative bias voltage may be applied to junction J1 from a negative source, e.g., −6v through a resistor 32 to insure that regardless of the setting of potentiometer 28 under normal load level operation the output voltage of amplifier 30 is always negative.

The output voltage of amplifier 30 is supplied as the input voltage, designated $E_I$, to a novel forward rate limiter 35, whose output, designated $E_O$, is used as the input voltage to a feed motor controller 36. The latter controls the direction of rotation and the speed of rotation of the feed motor 15 as a function of $E_O$, supplied thereto. For explanatory purposes, it is assumed that $E_O$ is variable between −6v, which represents 100% speed in the forward direction, and +6v representing 100% speed in the reverse direction. When $E_O = 0$ the feed motor is stopped.

The function of the rate limiter 35 is to limit the rate of increase of the forward speed of the feed motor 15 not to exceed a selected rate. However, the limiter 35 does not affect the rate of decrease of the motor's forward speed, nor does it affect the rate of increase or decrease of the speed of feed motor 15 in the reverse direction. Briefly, such control is achieved by limiter 35, whose output $E_O$ is made equal to its input $E_I$, except when $E_O$ becomes 0v and $E_I$ is more negative. Under the latter condition $E_O$ becomes negative at a controlled rate until it equals $E_I$.

Figure 3:
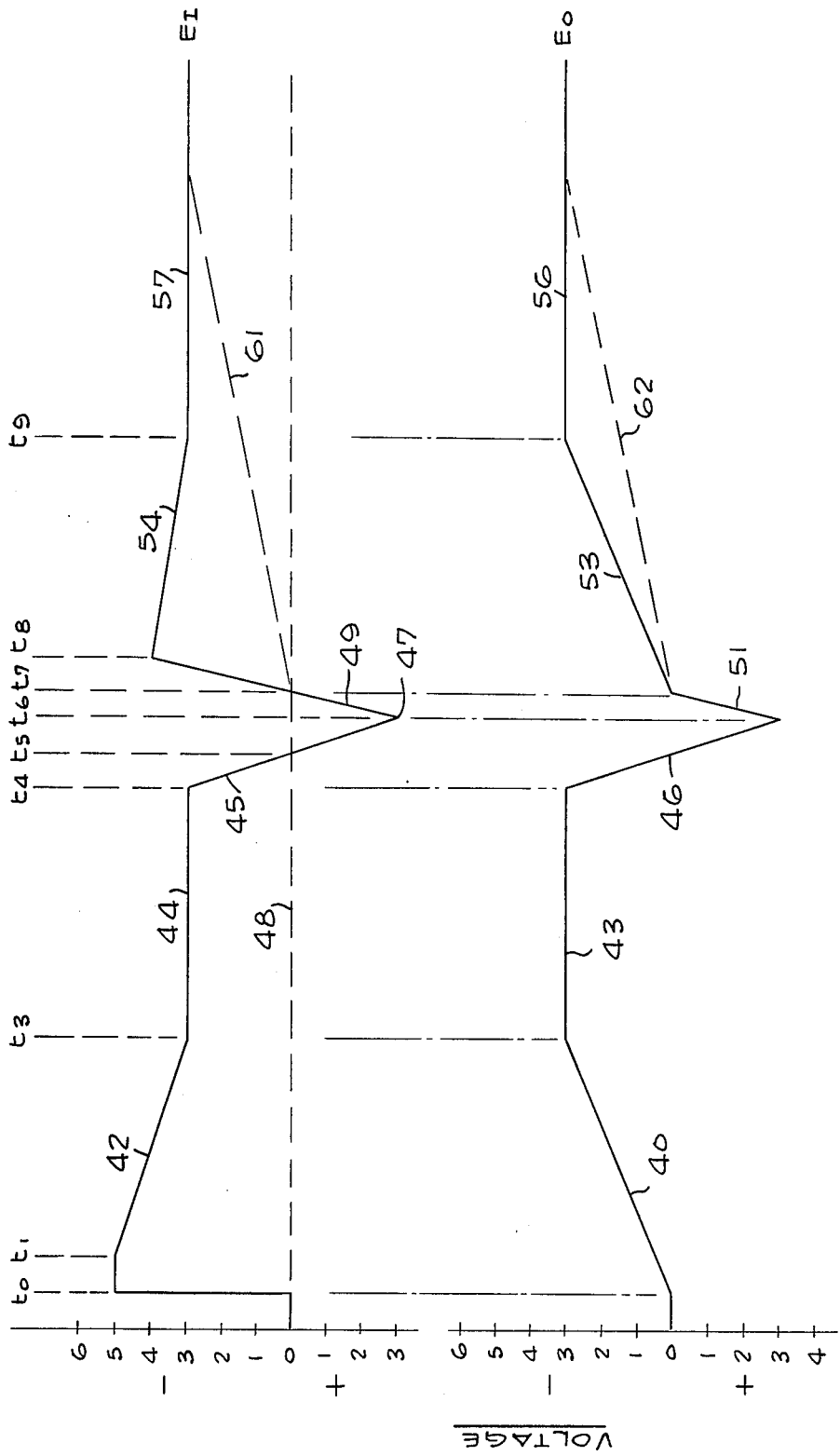
FIG. 3 is a waveform diagram, useful in explaining the advantages of the invention, incorporating a forward rate limiter shown in FIG. 2.

The performance of limiter 35 may best be described in connection with the waveform diagrams for $E_I$ and $E_O$, as shown in FIG. 3. Let us assume that at time $t_0$ the system is turned on. At this point in time $E_O = 0$. Let it further be assumed that the blade 11 does not engage the concrete, i.e., the cutting motor is unloaded. However, due to the setting of potentiometer 28 and the idle current of cutting motor 10, let it be assumed that $E_I = -5v$. Since $E_I < E_O$ the rate limiter 35 causes its output $E_O$ to ramp, i.e., increase in the negative direction at a controlled rate, as represented by line 40. As $E_O$ increases in the negative direction (polarity) the feed motor starts turning in the forward direction from 0 speed at an increasing speed, which is related to the rate of increase of $E_O$. Consequently, the cutting motor 10 with blade 11 starts to move toward the concrete.

At time $t_1$ it is assumed that the blade 11 first engages the concrete and thereafter starts cutting the concrete as the feed motor 15 continues to rotate in the forward direction at an increasing speed. As cutting starts the cutting motor load level increases so that the output of detector 25 becomes more positive and therefore $E_I$ starts to become less negative, as represented by line 42. As the feed motor 15 forward speed continues to increase the cutting motor load level increases until at time $t_3$, $E_I = E_O$, which in FIG. 3 is assumed to occur when $E_I = E_O = -3v$. This represents the desired load level condition. Once $E_O = E_I$ the feed motor 15 forward speed remains constant, as represented by line 43, and the concrete is cut at a substantially constant cutting motor load level, as represented by line 44.

Let it be assumed that at time $t_4$ the blade 11 encounters harder matter, such as steel reinforcing bar, hereinafter referred to as rebar. Consequently, the cutting motor load level increases above the desired load level, namely the cutting motor is operating at an overload level, and $E_I$ increases, i.e., becomes less negative, as represented by line 45. As $E_I$ becomes less negative than $E_O$, $E_O$ follows $E_I$ and therefore it becomes less negative at the same rate as represented by line 46, thus reducing the feed motor forward speed. In FIG. 3 it is assumed that, despite the reduced forward speed of the feed motor, the cutting motor load level keeps increasing. At time $t_5$ when the overload level has increased so that $E_I = E_O = 0$, the feed motor 15 comes to a full stop. For explanatory purposes let it be assumed that when the overload level is such that $E_I = 0$ it represents a threshold overload level or condition, as represented by dashed line 48.

For the waveforms of FIG. 3 it is assumed that in spite of the fact that feed motor 15 stopped at time $t_5$, due to overall system inertia or due to the blade 11 having become jammed in the rebar. Whenever the overload level increases beyond the threshold overload level, $E_I$ becomes positive. $E_O$ also becomes positive, and changes at the rate of increase (in the positive direction) of $E_I$. Consequently, the feed motor is rotated in the reverse direction at a speed which increases from zero speed at the rate of increase of $E_O$ in the positive direction.

For explanatory purposes let it be assumed that due to the reverse direction of rotation of the feed motor 15 at $t_6$ the overload level reaches a maximum level as represented by point 47, and thereafter starts to decrease, as represented by line 49. As $E_I$ becomes less positive, $E_O$, which follows $E_I$ also become less positive, as represented by line 51, and therefore the reverse speed of feed motor 15 reduces, until time $t_7$ when $E_I = E_O = 0$, and the feed motor comes to a stop.

As shown in FIG. 3 between $t_7$ and $t_8$ the overload level keeps decreasing ($E_I$ becomes more negative) at a significant rate so that at time $t_8$ the cutting motor 10 is actually underloaded. However, once $E_O = 0$ at time $t_7$ it does not follow the rate at which $E_I$ becomes more negative (between $t_7$ and $t_8$). Rather, it ($E_O$) becomes more negative at a selected rate as represented by line 53, which is controlled by limiter 35. Consequently, the feed motor starts rotating from zero speed in the forward direction at a speed whose rate of increase is controlled by limiter 35. To complete the description of FIG. 3 it is assumed that after $t_8$, as the feed motor forward speed increases, the cutting motor load level starts to increase as represented by line 54 until at time $t_9$ the desired cutting load level is achieved, when $E_I = E_O$. Therefore, cutting continues at a substantially constant forward speed of feed motor 15, as represented by line 56, and at a substantially constant load as represented by line 57.

The input $E_I$ can be thought of as the load level signal, which is related to the cutting motor load level and the desired cutting load level, the latter being a function of the setting of potentiometer 28. $E_O$, which is supplied to the controller 36 can be thought of as a feed motor control signal, which controls the speed and direction of rotation of the feed motor. When the load level signal ($E_I$) indicates an underload condition, i.e., the cutting motor load level is less than a selected desired load level, the limiter 35 provides the feed motor control signal to increase the forward speed at a controlled rate until the desired load level (line 44) is reached, and thereafter maintains the forward speed constant (line 43) as long as the desired load level is not exceeded. When an overload condition occurs, i.e., when the cutting motor load level exceeds the desired load level (line 45) the forward speed is reduced at a rate corresponding to the rate of overload increase until the overload level equals a threshold overload level (at time $t_5$ when $E_I = E_O = 0$) at which time the feed motor is stopped. If the overload level exceeds (is greater than) the threshold overload level the feed motor control signal causes the feed motor to rotate in a reverse direction, first at an increasing rate related to the rate of increase of the overload level above the threshold overload level. Then, as the overload level decreases toward the threshold overload level, the reverse speed decreases at a rate corresponding to the rate of decrease of the overload level toward said threshold load level. Once the overload level is less than the threshold load level the limiter 35 again controls the rate of forward speed increase of the feed motor to be substantially constant, until the cutting motor load level returns to the desired load level.

It should be pointed out that in most cases as the overload level starts to decrease from its peak level (point 47) the rate at which the decrease occurs is quite high, so that the overload level decreases to the overload threshold level and beyond, very rapidly. Quite often the load level falls below the desired load level, as indicated at time $t_8$ in FIG. 3. However, under some conditions once the overload level becomes less than the threshold level, its rate of decrease toward the desired load level may be quite low, as indicated in FIG. 3 by dashed line 61. If the rate of decrease of the overload level is less than the controlled rate of forward speed increase of the limiter 35, the forward increase speed rate is controlled by the rate at which the overload level decreases toward the desired load level, as indicated by FIG. 3 by dashed line 62. Thus, the feed motor's forward increased speed rate is that provided by the limiter, or by the rate at which the overload level decreases from the threshold overload level toward the desired load level, whichever of the two rates is less.

In the foregoing description in conjunction with FIG. 3 it is assumed that the potentiometer 28 is set so that under underload conditions $E_I$, i.e., the load level signal is −5v, and that as the cutting motor load level increases (line 42) it reaches the desired cutting load level when $E_I = E_O = -3v$, which represents a 50% motor speed in the forward direction. The acutal cutting motor load level is indicated to the operator by means of an ammeter. In operation, the operator adjusts potentiometer 28 so that the feed motor reaches a constant speed in the forward direction, when a desired current reading on the meter occurs representing the desired cutting load level. If with constant feed motor speed in the forward direction the meter reading is too low, the potentiometer 20 is adjusted so as to increase the feed motor speed and thereby increase the cutting motor load level to the desired load level. On the other hand if the meter reading is too high for the particular cutting motor the potentiometer is adjusted so that the constant speed is decreased thereby reducing the actual cutting motor load level until it equals the desired cutting load level. It should be stressed that the feed motor forward speed reaches a constant level when $E_I = E_O$. It is thus clear that by varying the setting of potentiometer 28 the load level signal can be varied so that the feed motor forward speed reaches a constant level when the cutting motor load level is substantially equal to the desired cutting load level.

Figure 4:
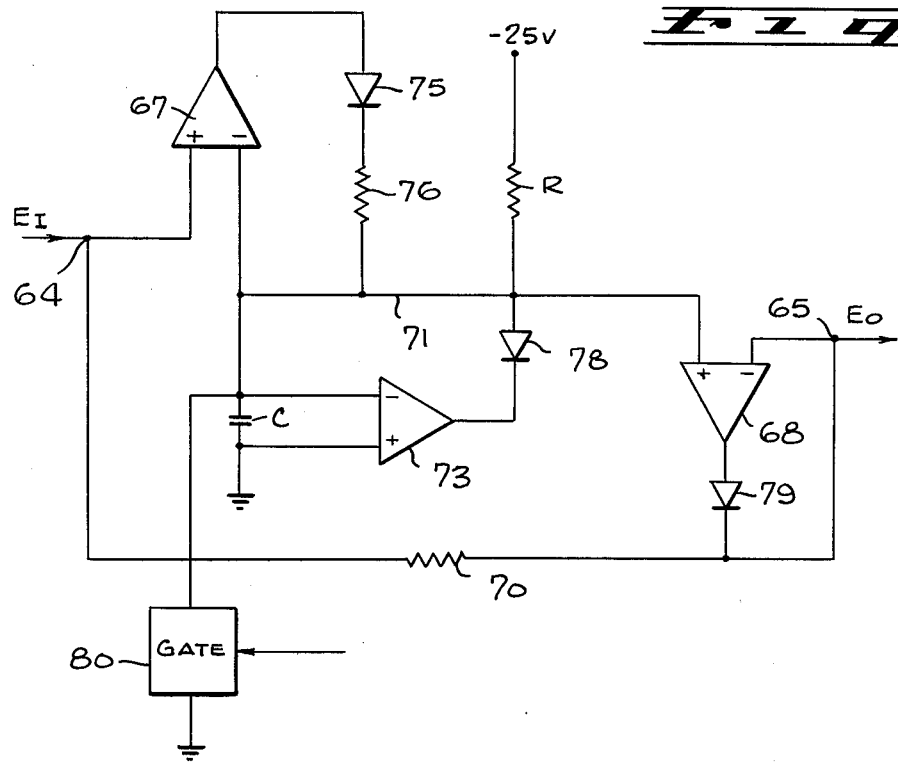

Attention is now directed to FIG. 4 wherein one embodiment of the forward rate limiter 35 is diagrammed for the above-assumed polarities of the load level signal $E_I$, and the feed motor control signal $E_O$. The limiter 35 is shown to include an input terminal 64 to which $E_I$ is applied, and an output terminal 65 at which $E_O$ is provided. Terminals 64 and 65 are respectively connected to the plus (+) input of an amplifier 67 and to a minus (−) input of an amplifier 68. Also, terminal 64 is connected to terminal 65 through a resistor 70. A line 71 interconnects the minus input of amplifier 67 and the plus input of amplifier 68, as well as, the minus input of an amplifier 73. A capacitor C is connected across the minus and plus inputs of amplifier 73, whose plus input is grounded. The limiter 35 also includes a charging resistor R which is connected between a negative potential, e.g., −25v and through line 71 to the ungrounded side of capacitor C, while a diode 75 and a resistor 76 are connected in series between the output of amplifier 67 and line 71. Another diode 78 is connected between line 71 and the amplifier 73 output, while another diode 79 is connected between the output of amplifier 68 and terminal 65.

The performance of the limiter will be described in connection with the waveforms of FIG. 3. When the system is turned On, capacitor C is discharged so that line 71 is at ground (0v). However, $E_I$ is at a negative potential such as −5v (at $t_0$). Thus, since the minus input of amplifier 67 is more positive than its plus input, the output of amplifier 67 is negative, backbiasing diode 75. The capacitor C is being charged through the charging resistor R, without any discharging through backbiased diode 75. Also, when the system is turned On, since line 71 is at 0v and $E_I$ is negative (−5v) the output of amplifier 68 is positive, thereby forward biasing diode 79. It draws sufficient current through resistor 70 so that the limiter output $E_O$ follows the plus input to amplifier 68, namely the potential on line 71 which is the potential across the capacitor C, which is being charged up. The voltage drop across diode 79, can for all practical purposes, be considered as negligible.

As the capacitor C is being charged up the potential at line 71 becomes more negative, and therefore $E_O$ becomes more negative, as represented in FIG. 3 by line 40. A relatively high negative potential such as −25v is chosen as the source of charging potential, to substantially insure that the charging of the capacitor C is at a substantially linear rate. As long as the potential across capacitor C is less negative than $E_I$, the charging continues. When the capacitor potential (on line 71) reaches and then attempts to exceed (in the negative direction) $E_I$, the output of amplifier 67 becomes positive thereby forward biasing diode 75. As a result, diode 75 and resistor 76 provide a discharge path for capacitor C as it is being charged through resistor R.

When $E_I$ is equal to the potential across the capacitor C the rate of discharge of the capacitor is substantially equal to the rate of charging, so that the potential on line 71 and therefore $E_O$ is constant and is equal to $E_I$. This is indicated in FIG. 3 by lines 43 and 44. When an overload condition occurs, such as at time $t_4$ and $E_I$ increases in the positive direction, the rate of the capacitor C discharge is greater than the rate at which it is being charged. Therefore the potential across the capactior C, i.e., the potential on line 71 or $E_O$ drops at the rate which the capacitor is being effectively discharged which is equal to the rate of increase of $E_I$. This is represented by lines 45 and 46.

When the overload is such that $E_I$ increases to 0v and thereafter increases in the positive direction the capacitor C is discharged until it is fully discharged to 0 volts. However, once it is discharged to 0 volt amplifier 73 together with diode 78 prevents it from becoming charged positively. As long as line 71 is at a negative potential the output of amplifier 73 is positive. Consequently, diode 78 is backbiased. However, as the capacitor C starts to become charged in the positive direction the diode 78 is forward biased, thereby providing a fast discharge path (through the output impedance of amplifier 73) for C, and thereby preventing it from being charged positively. Thus, the potential on line 71 cannot exceed zero volt.

When $E_I$ is of a positive polarity, such as after time $t_5$, since the plus input of amplifier 68 is at 0 volt and its minus input is more positive the output of amplifier 68 becomes negative, thereby backbiasing diode 79. Consequently, $E_O$ follows and is equal to $E_I$. From the foregoing it should thus be appreciated that since capacitor C is prevented by amplifier 73 and diode 78 from becoming charged in the positive direction once capacitor C is discharged to 0v, line 71 is at 0v and cannot become positive. Therefore, as long as $E_I > 0$ diode 79 is backbiased and $E_O$ equals $E_I$ and follows the changes in $E_I$ as shown in FIG. 3 between $t_5$ and $t_7$.

When, as shown in FIG. 3, after $t_7$, $E_I$ again goes negative, since at time $t_7$ line 71 is at 0 volt, the output of amplifier 68 goes positive, forward biasing diode 79 so that $E_O$ follows the potential on line 71, i.e., the potential across the capacitor C which is again being charged up in the negative direction through R, at the fixed rate (controlled by the time constant RC) until the potential across the capacitor again equals $E_I$, as hereinbefore described. It should again be pointed out that if $E_I$ decreases, i.e., becomes more negative at a rate which is lower than the charging rate of the capacitor C through resistor R, as represented by dashed line 61, the charging rate would be limited to the rate of change of $E_I$ as represented by line 62. This is so since every time the negative potential across C equals that of $E_I$ and attempts to become slightly more negative the amplifier 67 output becomes positive, forward biasing diode 75 and thereby providing a discharge path for the capacitor C, so as to maintain the potential of the latter to be equal to $E_I$.

As shown in FIG. 4 the ungrounded side of capacitor C is connected to ground through a gate 80. The latter is activated to ground the capacitor C and thereby discharge it, whenever the system is turned Off, or when the feed motor 15 is stopped by means of a manually activated switch, as will be described hereinafter. Such capacitor discharging is necessary so that when the system is again turned On if forward increased speed is required such forward speed is increased from zero at the controlled rate. If the capacitor were to remain charged and the system were turned On when forward speed is required, the feed motor would start rotating in the forward direction at a speed corresponding to the charged up capacitor rather than from zero forward speed.

In the foreqoing description it was assumed that when $E_O$ is negative the feed motor rotates in the forward direction, while rotating in the reverse direction when $E_O$ is positive. The speed of rotation depends on the magnitude of $E_O$, with +6v being assumed 100% reverse and −6v 100% forward. When $E_O = 0$ the feed motor is stopped.

Attention is now directed to FIG. 5 which is a combination schematic and logic diagram of a novel embodiment of the feed motor controller 36 to which $E_O$ is applied as the input. In FIG. 4 the feed motor 15 is also diagrammed. The controller 36 includes amplifiers U1A and U1B which serve as comparators. $E_O$ is applied to the plus input of U1A and the minus input of U1B. A feedback network, consisting of resistors R1 and R2 and a capacitor C1 provides a feedback signal from the feed motor 15 to the plus input of U1B. The feedback signal polarity and amplitude are related to the feed motor direction of rotation and speed, in a manner analogous to $E_O$. That is, the feedback signal is negative when the feed motor rotates in the forward direction and is positive when the motor rotation is in the reverse direction. The feedback signal amplitude is related to the actual feed motor speed. Thus, whereas the amplitude of $E_O$ is related to the desired feed motor speed the feedback signal is related to the actual feed motor speed.

As shown in FIG. 5 the output of U1A is inverted by an inverter U2B, whose output is connected to system ground (to which grounded $\phi A$ is connected) through resistors R5 and R4. The junction of the two resistors is connected to the minus input of U1A. Basically, the function of U1A is to provide an ouput whose polarity is the same as $E_O$. When $E_O$ is equal to zero (for zero feed motor speed) the polarity of the U1A output is the same as it was prior to $E_O$ being zero.

The operation of the controller 36 may best be described with a specific example. Let it be assumed that $E_O$ is positive and that the feedback signal is less positive than $E_O$. That is, the actual speed is less than the desired speed. Therefore the output of U1B is negative. However, since $E_O$ is positive, the output of U1A is positive. The outputs of U1A and U1B are applied to an Exclusive or gate U2A, which with one positive input and one negative input provides a positive output, representing an Enable signal which indicates that more power should be supplied to the feed motor. The Enable signal is supplied as one input to each of Nand gates U3B and U3C. The output of U1A designated Drive Polarity, which in the particular example is positive, is supplied to Nand gate U3B while the output of inverter U2B designated Drive Polarity is supplied to U3C. When $E_O$ is positive Drive Polarity is positive and Drive Polarity is negative.

The controller 36 also includes a lead line network connected to a power line 85 to which $\phi B$ is applied. It consists of a capacitor C2 and a resistor R3 which is connected to an inverter U3A, whose output is in turn connected to another inverter U2C. The output of the latter is connected through a capacitor C4 and a resistor R8 to the third input of U3B. A PNP transistor Q1 has its base connected to the U3B output, its emitter to +6v, and its collector to the third input of U3B through a relatively large resistor R9 and to one input, designated by numeral 86 of an isolator Z1, whose other input is connected to −6v. The two outputs of isolator Z1 are designated by 87 and 88. They are connected to the emitter and collector of an output transistor QZ1 of Z1. Output terminal 87 is connected to the gate of an SCR1 while terminal 88 is connected to resistor R11, which is connected through a capacitor C6 to power line 85. The anode of SCR1 is connected to power line 85 while its cathode is connected to power line 90 which is supplied to the feed motor 15.

In operation, when the line voltage on line 85 first reaches its negative crest, and then becomes slightly less negative, due to the lead network of C2 and R3 the current flowing therethrough leads the voltage by about 90° and therefore changes from negative to positive. Thus, the output of U3A goes negative and that of U2C goes positive. This positive output momentarily overrides the negative potential at terminal 86. Since at this instant the Enable and Drive Polarity signals are assumed to be positive all three inputs to U3B are positive. Thus, its output goes negative, turning on transistor Q1, so that terminal 86 goes positive, thereby latching the third input to U3B through R9 to remain positive, as long as Q1 is on.

When terminal 86 stays positive, isolator Z1 is turned On, so that its output transistor QZ1 conducts and therefore for all practical purposes a short exists between terminals 87 and 88 and the gate of SCR1 can be thought of as being connected to terminal 88. As the line voltage rises from the negative crest and approaches zero C6 and R11 which acts as a lead network apply a positive voltage at the gate of SCR1. Consequently, when the line voltage on line 85 crosses zero in the positive direction the SCR1 is forward biased and therefore conducts positive half cycles to the motor from line 85 to line 90. These positive half cycles increase the speed of the motor 15 in the assumed reverse direction.

When $E_o$ is negative the output of U1A is negative. If the speed of the motor is such that the feedback signal is less negative (greater) than $E_o$ the output of U1B is positive. Thus, Exclusive Or gate U2A provides the positive Enable signal to U3C. Since the output of U1A is negative, that of U2B, i.e., the Drive Polarity signal is positive. Thus, two of the inputs of U3C are positive. When the line voltage on line 85 reaches its positive crest and then starts decreasing, due to R3 and C2 the input of U3A changes from positive to negative so that its output goes positive, thereby applying a positive pulse through C3 and R6 to the third input of U3C. Thus, its output goes negative, turning on transistor Q2 and thereby clamping the third input of U3C to positive through resistor R7. As long as Q2 is on, terminal 93 is substantially at +6v, thereby turning on isolator Z2, whose output transistor QZ2 is turned On. Capacitor C5 and resistor R10 perform an analogous function to that of C6 and R11. Thus, when the line voltage changes from positive to negative SCR2 conducts the negative half cycles to the feed motor, which are assumed to cause it to turn in the forward direction.

When the feedback signal applied to U1B becomes slightly more negative (less) than $E_o$, the output of U1B goes negataive and since the output of U1A is negative the output of Exclusive Or gates U2A changes from positive to negative. Consequently, U3C's output goes positive cutting off Q2 which in turn cuts off isolator 22. As a result QZ2 is cut off. During the subsequent negative half cycles Zener diode ZD2 turns on Q4 to clamp SCR2 and thereby prevent additional negative half cycles from being conducted to the feed motor 15 via line 90.

As shown in FIG. 5 a snubber circuit 95, simply referred to as a snubber, and consisting of resistor R12 and capacitor C7 is connected across the two SCR's. As is appreciated the function of the snubber is to prevent any spikes or other undesired pulses which may be fed from the motor 15 from accidentally forward biasing either of the SCR's. Some small current leaks through the snubber 95, when both SCR's are cut off. However, this leakage current is insufficient to affect the motor 15. Also shown in FIG. 5 are two diodes 97 and 98 respectively connected between the input of U3A and +6v and −6v. The function of these diodes is to limit the input to U3A to vary only between +6v and −6v.

The feed motor 15 of the present invention includes a full bridge rectifier type arrangement 100, hereinafter referred to as bridge rectifier 100. It consists of diodes 101–104. The bridge rectifier defines dc terminals 105 and 106 across which the feed motor's field winding, designated F, is connected. It also includes two ac terminals 109 and 110. Terminal 109 is shown connected to line 90 and terminal 110 to end 112 of the armature winding, designated by A, while end 113 of the armature winding is connected to grounded phase $\phi A$.

It should be appreciated that with this arrangement since the field winding F is connected across the dc terminals of the rectifier 100 its magnetic force is always of the same polarity. However the armature winding A is in series with the ac connections and therefore its magnetic force is in one direction during positive half cycles and in the opposite direction during negative half cycles. During a positive half cycle diodes 101 and 103 conduct. The terminals 105 and 103 and plus and minus respectively and terminal 112 is positive with respect to terminal 113. With such polarities the feed motor is assumed to rotate counterclockwise (CCW), which for the arrangement of FIG. 1 is assumed to be in the reverse direction. During a negative half cycle diodes 104 and 102 conduct. However, while dc terminals 105 and 106 are positive and negative respectively, terminal 112 is negative with respect to terminal 113 and therefore the motor rotates clockwise (CW) which is assumed to be the forward direction. Thus, it is seen that negative half cycles cause the feed motor to rotate in one direction, e.g., CW, while positive half cycles cause the feed motor to rotate in the opposite direction, e.g., CCW.

From the foregoing it should thus be appreciated that the novel controller 36 controls the direction of rotation and speed of the feed motor as a function of the input signal $E_o$ which is supplied to the controller and a feedback signal from the motor. The feedback signal amplitude is related to the feed motor speed and its polarity is related to the motor's direction of rotation. The polarity and amplitude of $E_o$ indicate the desired direction of rotation and speed, respectively of the feed motor. The two signals, $E_o$ and the feedback signals are compared and whenever the actual motor speed, as represented by the feedback signal, is less than the desired speed, as represented by the amplitude of $E_o$ and $E_o$ is of a first polarity, e.g., positive, half cycles of an ac signal, e.g., the positive half cycles are applied to the motor to increase its speed in the direction represented by the polarity of $E_o$, until the actual speed is substantially equal to the desired speed. On the other hand when $E_0$ is of a second polarity, e.g., negative, and the actual motor speed is less than the desired speed negative half cycles are applied to the feed motor to increase its actual speed to the desired speed.

In the foregoing exemplary embodiment it was assumed that when $E_0$ is negative, negative half cycles are applied to the feed motor to cause it to rotate in the forward direction, and that when $E_0$ is positive, positive half cycles are applied to the motor to cause it to rotate in a reverse direction. It should be apparent that the terms forward and reverse are related to the rest of the concrete cutting system, as shown in FIG. 1. When viewed in the direction of arrow X (see FIG. 1) for the cut in the concrete slab 12 from left to right the forward direction is when the feed motor rotates in a clockwise (CW) direction, so that the carriage 13 is moved from left to right. The reverse direction is one when the feed motor rotates in a counterclockwise (CCW) direction, moving the carriage to the left. If, however, a cut from right to left is desired, the CCW direction of rotation of the feed motor will be the forward direction while the CW direction of rotation will be the reverse direction.

Figure 6:
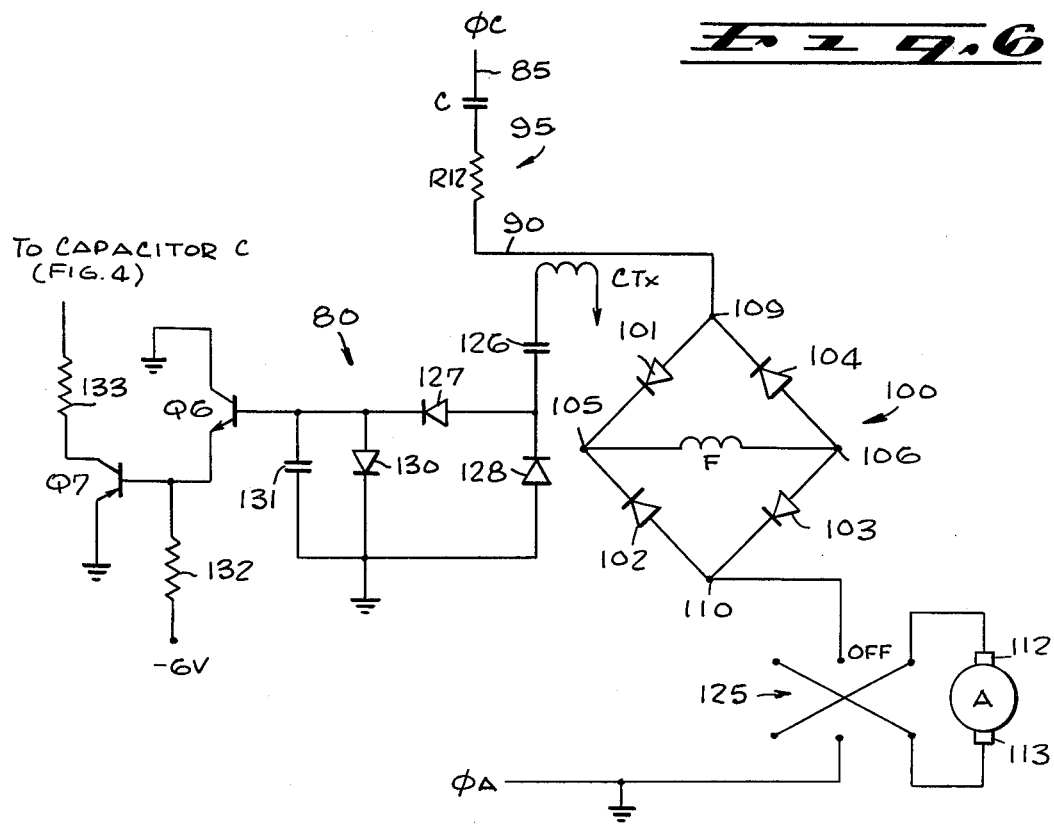
FIG. 6 is a diagram useful in explaining an additional aspect of the present invention.

In order to enable an operator to select either direction of rotation of the feed motor as the forward direction while the opposite direction of rotation will be the reverse direction a 3-position switch 125, as shown in FIG. 6, is inserted between terminal 110 of the bridge 100 and the armature winding A. The center position (as shown) is the Off position. In this position the armature winding A is decoupled from the field winding F and therefore not even leakage current flows to line 90 through the snubber consisting of C7 and R12. When the switch 125 is thrown to the right terminal 110 is connected to terminal 112 and terminal 113 is connected to rounded $\phi A$. This is like the arrangement shown in FIG. 5. Thus, as assumed therein the forward direction is the CW direction of rotation. However, when switch 125 is thrown to the left terminal 110 is connected to terminal 113 while terminal 112 is grounded. Thus, the CCW direction of rotation of the motor will be the forward direction.

In FIG. 6 one embodiment of gate 80 (see FIG. 4) is diagrammed. As previously pointed out the function of the gate is to discharge capacitor C in the rate limiter 35 to ground when the system is turned Off. The gate 80, as shown in FIG. 6, consists of a current transformer CTx which senses the current in line 90. It includes a capacitor 126, a voltage doubler in the form of diodes 127 and 128, a voltage limiting diode 130, a capacitor 131, an NPN transistor Q6, a resistor 132, and a PNP transistor Q7 whose collector is connected to capacitor C in the rate limiter through a resistor 133.

Briefly, when switch 125 is in the Off position no current flows in line 90. Therefore no positive change is built up on capacitor 131, and Q6 is cut off and Q7 conducts, thus discharging capacitor C in the rate limiter to ground through resistor 133 and Q7. However, when switch 125 is in other than the Off position, some current leaks through the snubber and flows through line 90. Although this current is insufficient to turn the feed motor it is sensed by CTx which charges up capacitor 131 to +.6v limited by diode 130. Consequently, Q6 is turned on pulling the base of Q7 to ground, and thereby cutting off Q7, which in turn cuts off the discharge path for the capacitor C through Q7. Such an arrangement is desirable to insure that once the system is turned off the capacitor C is discharged. Thus, when the system is turned On again any required forward speed starts increasing from zero at the controlled rate rather than from a higher than zero speed which would occur if the capacitor C were not fully discharged.

Although the particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In a machine for cutting material an arrangement comprising;

a cutting tool;

a cutting motor to which said cutting tool is coupled for producing a cutting motion of said tool at a rate proportional to the level of current supplies to said cutting motor, which level is in turn proportional to the load level of said cutting motor which is related to the load of said cutting tool;

a bidirectional variable speed feed motor for producing relative motion in a forward direction between said cutting tool and material to be cut, thereby feeding material to said cutting tool, and for producing relative motion in a reverse direction, which is opposite said forward direction, between said cutting tool and said material;

first means for continuously detecting said level of current to said cutting motor for providing a first signal proportional to the cutting motor load level;

second means responsive to said first signal and to a selected second signal or providing a load level signal which is indicative of the cutting motor load level with respect to a desired cutting load level; and third means responsive to said load level signal for controlling said feed motor to produce relative motion in the forward direction at a controlled rate of increase when the cutting motor load level is less than said desired cutting load level, for controlling said feed motor to maintian the relative motion in the forward direction at a substantially constant level when the cutting motor load level is substantially equal to said desired load level, for controlling said feed motor to decrease the relative motion in the forward direction at a rate substantially equal to the rate of increase of the cutting motor load level from said desired level toward a threshold load level, for controlling said feed motor to produce relative motion in the reverse direction at rates related to the rates of change of the cutting motor load level when the latter exceeds said threshold load level, and for controlling said feed motor to produce relative motion in the forward direction, when said cutting motor load level decreases below said threshold load level, at an increasing rate which is substantially equal to either the rate of decrease of the cutting motor load level below said threshold load level or at a controlled rate of increase, whichever rate is smaller.

2. The arrangement as described in claim 1 wherein said load level signal is of a first polarity when said cutting motor load level exceeds said threshold load level, is substantially equal to a reference amplitude, definable as ground, when said cutting motor load level is substantially equal to said threshold load level, and is of a second polarity when the cutting motor load level is less than said threshold load level, the amplitude of said load level signal being greater than a desired amplitude when said cutting load level is less than said desired load level, the amplitude of said load level signal of said second polarity being less than said desired amplitude when the cutting motor load level is greater than said desired load level and less than said threshold load level.

3. The arrangement as described in claim 1 wherein said third means include forward rate control means responsive to said load level signal for providing an output signal of said first polarity and of an amplitude which is substantially equal to the amplitude of said load level signal when the latter is of said first polarity, for further providing said output signal of said second polarity with an amplitude which increases at a selected rate when said load level signal is of said second polarity, as long as the amplitude of said load level signal is greater than said desired amplitude, with said ouput signal being of said second polarity with its amplitude decreasing at the rate at which the amplitude of the load level signal which is of said second polarity decreases from said desired amplitude toward said reference amplitude, said forward rate control means further including means for providing said output signal of said second polarity with an amplitude which increases either at said selected rate or at the rate which the load level signal, when being of said second polarity increases in amplitude from said reference amplitude to said desired amplitude, whichever rate is less.

4. The arrangement as described in claim 3 wherein said third means further include feed motor control means responsive to the output signal of said forward rate control means for controlling said feed motor to provide relative motion in said forward direction when said output signal is of said second polarity at a rate related to the amplitude of said output signal, and for controlling said feed motor to provide relative motion in the reverse direction when the output signal is of said first polarity at a rate which is related to the amplitude of said output signal.

5. The arrangement as described in claim 4 wherein said feed motor control means include means coupled to said feed motor and to a source of an ac power signal, and means for comparing said output signal with a feedback signal from said feed motor for applying half cycles of said power signal of a selected first polarity to said motor so as to cause said motor to produce relative motion in the reverse direction when said input signal and said feedback signal are of said first polarity as long as the feedback signal amplitude is less than the output signal amplitude, and for applying half cycles of said power signal of a second polarity, opposite said first polarity, when said output signal and said feedback signal are of said second polarity as long as said feedback signal amplitude is less than the feedback signal amplitude, so as to provide relative motion in the forward direction.

6. The arrangement as described in claim 5 wherein said feed motor includes a field winding, an armature winding defining first and second ac terminals and first and second dc terminals, with said field winding being connected across said dc terminals, means for applying said ac power signal to said first ac terminal, and switch means for selectively connecting said armature winding between said second ac terminal and ground reference amplitude, to control the direction of rotation of said armature when said half cycles of either said first polarity or said second polarity are applied to said feed motor.

7. In a concrete cutting system of the type including a cutting tool or providing a cut in concrete, a cutting motor to which said cutting tool is attached for producing a cutting motion of said cutting tool, and a bidirectional feed motor, rotatable in a first direction, definable as a forward direction, for moving said cutting motor so as to feed concrete to be cut to said cutting tool, or in a second direction definable as a reverse direction, which is opposite said forward direction, the level of current to said cutting motor being proportional to the load level of said cutting motor as a result of the load on said cutting tool, an arrangement comprising:

first means for detecting the level of current to said cutting motor and for providing a first signal which is proportional to the cutting motor load level;

second means responsive to said first signal and to a second manually variable second signal for providing a load level signal which is related to the cutting motor load level and a desired cutting load level; and third means responsive to said load level signal for controlling said feed motor to rotate in said forward direction at a selected increasing rate when the cutting motor load level is less than said desired cutting load level, for controlling said feed motor to rotate in the forward direction at a substantially constant rate when said cutting motor load level is substantially equal to said desired load level, for controlling said feed motor to decrease its rotation in said forward direction at a rate which is equal to the rate of increase of said cutting motor load level from said desired load level toward a threshold load level, for controlling said feed motor to rotate in the reverse direction at rates related to the rates of change of the cutting motor load level, when the latter exceeds said threshold load level, and for further controlling said feed motor to rotate in the forward direction at an increasing rate, when said cutting motor load level is decreasing below said threshold load level, the rate of increase in the forward direction of said feed motor being substantially equal to either the rate of decrease of the cutting motor load level below said threshold level or to a selected increasing rate, whichever is smaller.

8. The system as described in claim 7 wherein said load level signal is of a first polarity when said cutting motor load level exceeds said threshold load level and is of a second polarity when said cutting motor load level is less than said threshold load level, said third means include forward rate limiting means responsive to said load level signal for providing an output signal which is of the same polarity as said load level signal, the amplitude of the output signal being substantially equal to the amplitude of the load level signal when the latter is of said first polarity, with the amplitude of said output signal increasing at said selected increasing rate when said load level signal is of said second polarity and its amplitude is greater than the output signal amplitude until the amplitude of said output signal is substantially equal to the load level signal amplitude, representing said desired load level.

9. The system as described in claim 8 wherein the amplitude of said load level signal is substantially zero when the cutting motor load level is substantially equal to said threshold load level, and said forward rate limiting means include means for controlling the output signal amplitude to increase at a rate definable as x when the load level signal amplitude increases from zero and the load level signal polarity is of said second polarity, x being equal to either the rate of increase of the load level signal amplitude or said selected increasing rate whichever is less.

10. The system as described in claim 9 wherein said feed motor control means include means coupled to said feed motor and to a source of an ac power signal, and means for comparing said output signal with a feedback signal from said feed motor for applying half cycles of said power signal of a selected first polarity to said feed motor so as to cause said motor to produce relative motion in the reverse direction when said input signal and said feedback signal are of said first polarity as long as the feedback signal amplitude is less than the output signal amplitude, and for applying half cycles of said power signal of a second polarity, opposite said first polarity, when said output signal and said feedback signal are of said second polarity as long as said feedback signal amplitude is less than the output signal amplitude, so as to provide relative motion in the forward direction.

11. In a concrete cutting system of the type including a cutting tool for producing a cut in concrete, a cutting motor to which said cutting tool is attached for producing a cutting motion of said cutting tool and a bidirectional feed motor, rotatable in a first direction, definable as a forward direction, for moving said cutting motor so as to feed concrete to be cut by said cutting tool, or in a second direction, definable as a reverse direction, which is opposite said forward direction, the level of current to said cutting motor being proportional to the load level of said cutting motor as a result of the load on said cutting tool, an arrangement comprising:

first means for defining a desired cutting motor load level;

second means for monitoring the actual load level of said cutting motor as a function of the current level to said cutting motor; and third means responsive to said first and second means for driving said feed motor in the forward direction at a speed which increases at a selected rate when the actual cutting motor load level is less than said desired load level until said feed motor reaches a speed at which said actual cutting motor load level is substantially equal to said desired load level, said third means including means for decreasing the speed of the feed motor in the forward direction at a rate which is equal to the rate at which said actual load level of said cutting motor increases above said desired load level, said third means further including means for controlling said feed motor to rotate in said reverse direction when the actual load level of said cutting motor is greater than the desired load level and exceeds a preselected threshold load level said third means further including means for increasing the speed of said feed motor in the reverse direction at a rate at which the actual load level of said cutting motor exceeds said threshold load level.

12. The system as described in claim 11 wherein said third means include means for decreasing the speed of said feed motor in the reverse direction at a rate at which the actual load level of said cutting motor decreases toward said threshold load level.

13. The system as described in claim 12 wherein said third means include feed motor control means responsive to a variable amplitude bipolar input signal for contolling said feed motor to rotate in the forward direction when said input signal is of a first polarity and at a speed related to the input signal amplitude, and for controlling said feed motor to rotate in the reverse direction when said input signal is of a second polarity, and at a speed related to the input signal amplitude.

14. The system as described in claim 13 wherein said third means include forward rate limit means responsive to said first and second means for providing said input signal to said feed motor control means, said forward rate limit means include means for providing said input signal of said first polarity when said actual load level of said cutting motor is less than said threshold load level and for increasing the amplitude of said input signal of said first polarity at said selected rate as long as the actual load level of said cutting motor is less than said desired load level.

15. The system as described in claim 14 wherein said forward rate limit means include means for limiting the rate at which said input signal of said first polarity increases to said selected rate, or to the rate at which the actual load level of said cutting motor decreases from said threshold load level toward said desired load level, whichever rate is less.

16. The system as described in claim 13 wherein said feed motor control means include feedback means for applying a feedback signal from said feed motor whose amplitude is related to the feed motor speed, the feedback signal being of said first polarity or said second polarity when said feed motor rotates in the forward direction or the reverse direction, and means for comparing said input signal with said feedback signal, and for applying half cycles of a first polarity of an ac power signal to said feed motor when said input signal and said feedback signal are of said first polarity, as long as the amplitude of said input signal is greater than the feedback signal amplitude, and for applying half cycles of a second polarity, opposite said first polarity, of said ac power signal when said input and feedback signals are of said second polarity as long as the amplitude of said input signal is greater than the feedback signal amplitude.

* * * * *